United States Patent [19]

Horiuchi et al.

[11] Patent Number: 5,646,741
[45] Date of Patent: Jul. 8, 1997

[54] IMAGE PROCESSING APPARATUS AND METHOD CAPABLE OF SMOOTHING IMAGE DATA IN ACCORDANCE WITH AN IMAGE ENLARGEMENT/REDUCTION RATIO

[75] Inventors: Izuru Horiuchi, Machida; Kazuyoshi Suzuki, Kawasaki, both of Japan

[73] Assignee: Canon Kabushiki Kaisha, Tokyo, Japan

[21] Appl. No.: 394,164

[22] Filed: Feb. 22, 1995

[30] Foreign Application Priority Data

Feb. 25, 1994 [JP] Japan .................. 6-028063

[51] Int. Cl.$^6$ .................. H04N 1/40; G06K 9/42
[52] U.S. Cl. .................. 358/298; 358/451; 358/453; 358/457; 382/298; 382/308
[58] Field of Search .................. 358/298, 401, 358/448, 451–453, 455–456, 462, 464; 347/131, 183, 184, 188; 382/190, 191, 194, 195, 205, 254, 264, 266, 269, 276, 277, 298, 299, 308; 395/102, 109, 112, 114, 128; 399/196, 197

[56] References Cited

U.S. PATENT DOCUMENTS

| 4,860,117 | 8/1989 | Sasaki | 358/451 |
| 4,864,413 | 9/1989 | Sasaki | 358/451 |
| 5,309,524 | 5/1994 | Hirabayashi et al. | 382/298 |
| 5,418,626 | 5/1995 | Semasa | 358/451 |
| 5,489,990 | 2/1996 | Ishikawa | 358/451 |

*Primary Examiner*—Eric Frahm
*Attorney, Agent, or Firm*—Fitzpatrick, Cella, Harper & Scinto

[57] ABSTRACT

An enlargement/reduction ratio setting unit 205 sets an enlargement/reduction ratio in accordance with the resolution of an input image and the resolution of an output image. A smoothing unit 201 smoothes the input image. A dither/line-gathered area detector 202 detects a dither/line-gathered area of the input image in accordance with the set enlargement/reduction ratio, and controls a switch 203 based on the detection result. Smoothing the image before enlargement/reduction is controlled in accordance with the enlargement/reduction ratio and the feature of an image area including a pixel of interest. This results in an output image of excellent image quality.

19 Claims, 8 Drawing Sheets

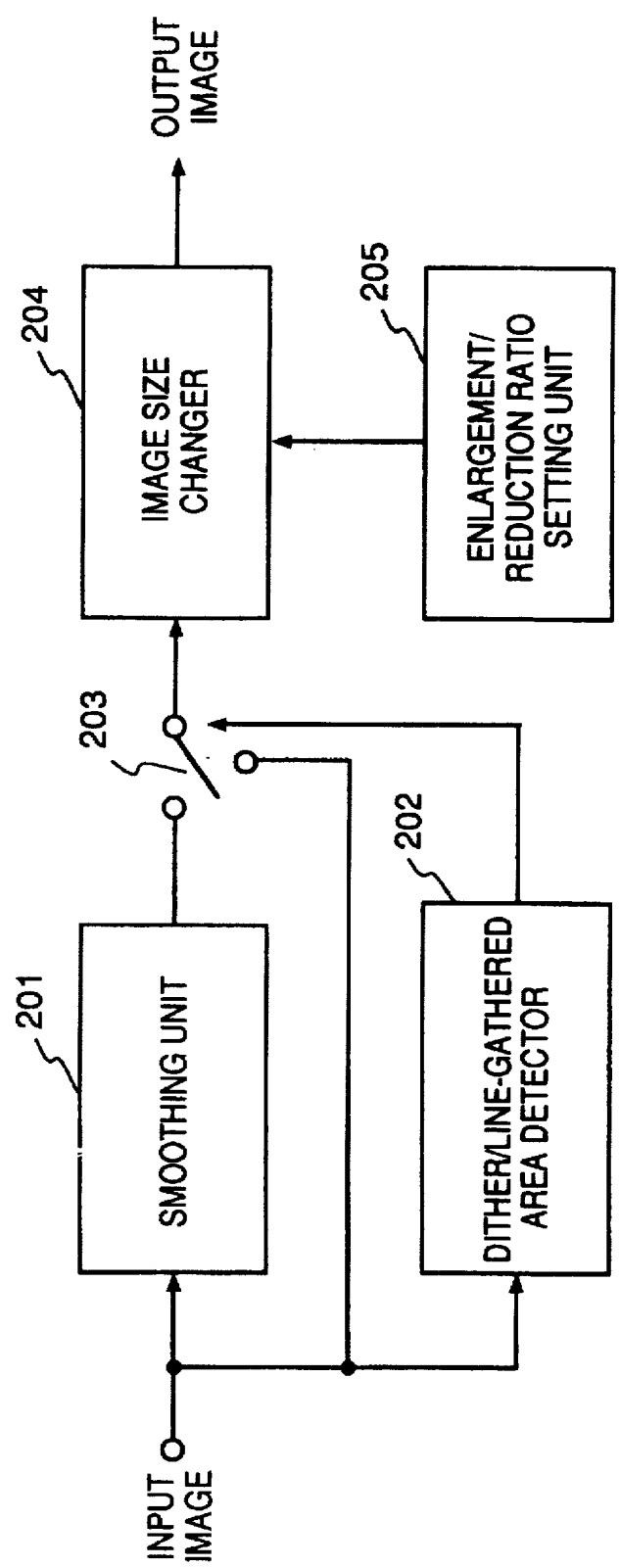

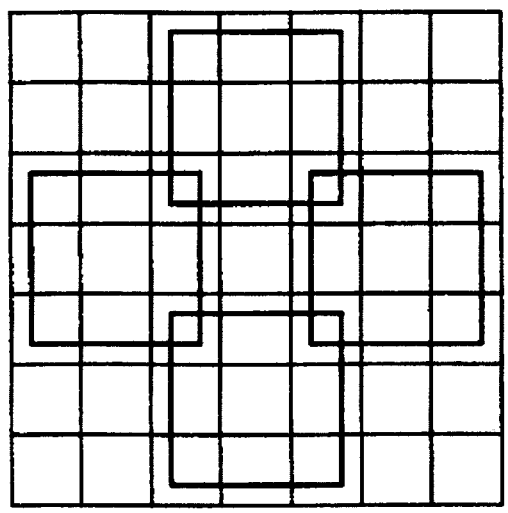
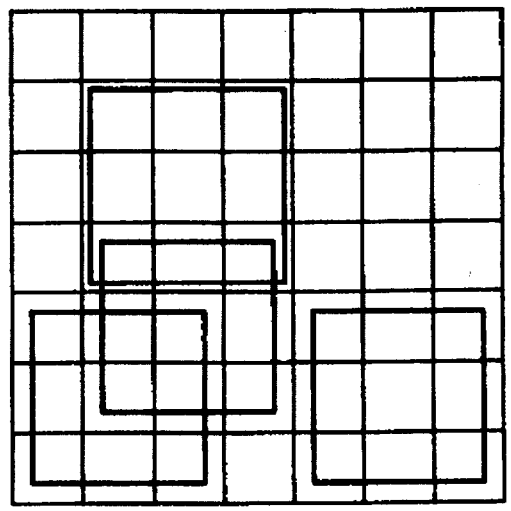
FIG. 8A          FIG. 8B
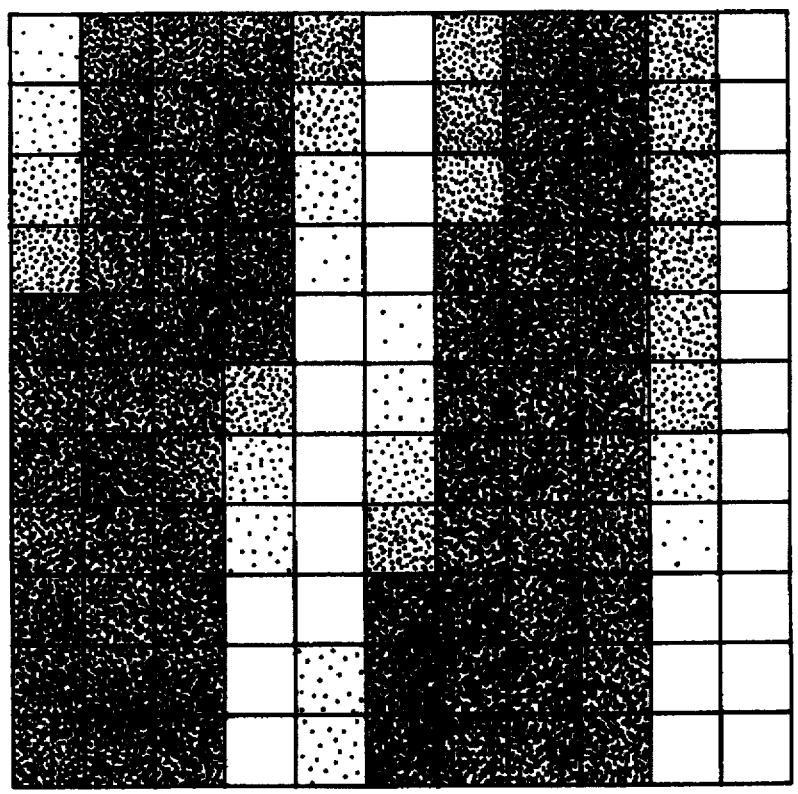
FIG. 9

IMAGE PROCESSING APPARATUS AND METHOD CAPABLE OF SMOOTHING IMAGE DATA IN ACCORDANCE WITH AN IMAGE ENLARGEMENT/REDUCTION RATIO

BACKGROUND OF THE INVENTION

Present invention relates to an image processing apparatus and method for converting the resolution of an image.

Recently, in the field of office automation devices, a network system formed by combining a printer, a facsimile apparatus, a digital copying machine, an electronic file etc. has been developed.

However, since the above system includes image information of different tone levels or different resolutions, converting the resolution or the number of tone levels is required at the respective devices. For example, a facsimile apparatus processes binary image data, and a digital copying machine, multi-level image data. Further, the variety of standards for business machines, improvement in digital processing technique and electrophotographic process for high-precision make it necessary to produce image data of many different resolutions.

In the above system, when a binary image is outputted by a digital copying machine, converting only the resolution of the image data results in an image having conspicuous jagged portions.

SUMMARY OF THE INVENTION

The present invention has been made in consideration of the above situation, and has as its object to solve the above problem and to obtain an output image of an excellent image quality by smoothing an image before the image is enlarged/reduced for converting resolution. The smoothing is made based on the result determined by whether or not the smoothing is to be performed on each pixel, in accordance with an enlargement/reduction ratio and a pattern within a predetermined area of the image.

The above object is attained by providing, as a preferred embodiment of the present invention, an image processing apparatus comprising: smoothing means for smoothing input image data; judgment means for judging whether or not smoothing is to be performed on each pixel of the image data, in accordance with a pattern of a predetermined area of the image data and a pre-set image enlargement/reduction ratio; and output means for selecting a pixel smoothed by the smoothing means or a pixel not smoothed, in accordance with the result from judgment by the judgment means, and outputting the selected image data.

Another object of the present invention is to obtain an output image of excellent image quality by smoothing the image before image enlargement/reduction for converting resolution, based on the result determined by whether or not the smoothing is to be performed on each pixel, in accordance with an enlargement/reduction ratio and a feature of a area including the pixel.

The above object is attained by providing, as another preferred embodiment of the present invention, an image processing apparatus comprising: smoothing means for smoothing input image data; judgment means for judging whether or not smoothing is to be performed on each pixel of the image data, in accordance with a feature of an area of the image data, including the pixel of interest, and a pre-set image enlargement/reduction ratio; and output means for selecting a pixel smoothed by the smoothing means or a pixel not smoothed, in accordance with the result from judgment by the judgment means, and outputting the selected image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the construction of an image processing apparatus which does not perform smoothing on a dither area and a line-gathered area;

FIGS. 8A and 8B are explanatory views of dither/line-gathered area detecting methods;

FIG. 9 shows an example of an output image enlarged from the image in FIG. 1A;

DETAILED DESCRIPTION OF THE PREFERRED EMBODIMENT(S)

Preferred embodiments of the present invention will be described in detail in accordance with the accompanying drawings.

Figure 1A:
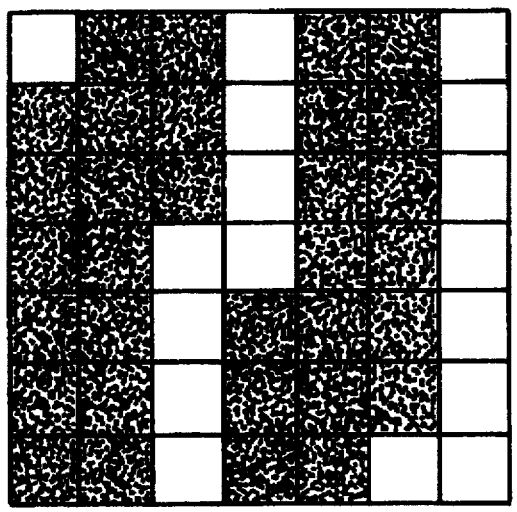
FIGS. 1A and 1B show an example of smoothing in a dither/line-gathered area.
Figure 1B:
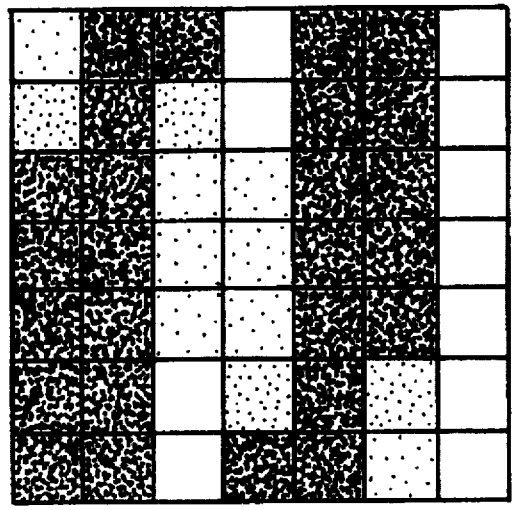

When a binary image is outputted from a digital copying machine, to reduce conspicuous jagged portions in the output image, smoothing the binary image before resolution conversion is considered. However, if a dither area (a halftone image area to be processed by the dither method) and a line-gathered area is smoothed, unnecessary tone-level change or an area where black pixels are diffused in a white pixel portion, i.e., a black corruption area, is generated. For this reason, smoothing such dither and line-gathered areas must be avoided. FIG. 1A shows an image before smoothing, and FIG. 1B, an image smoothed from the image in FIG. 1A.

FIG. 2 is a block diagram showing the construction of an image processing apparatus executing the above processing.

In FIG. 2, reference numeral 201 denotes a smoothing unit which performs smoothing on input binary image data; 202, a dither/line-gathered area detector which detects a dither area (a halftone image area to be processed by the dither method) or a line-gathered area from the input binary image data, and controls a switch 203 in accordance with the detection result; and 204, an image size changer which enlarges/reduces the input image data via the switch 203 in accordance with an enlargement/reduction ratio set by an enlargement/reduction ratio setting unit 205.

In the above construction, the input binary image data is smoothed except dither/line-gathered areas and then enlarged/reduced so that the resolution of the image data corresponds to that of, e.g., a digital copying machine. Thus, in a case where the binary image data from, e.g., a facsimile apparatus is outputted from the digital copying machine, an output image of excellent quality can be obtained.

Figure 3:
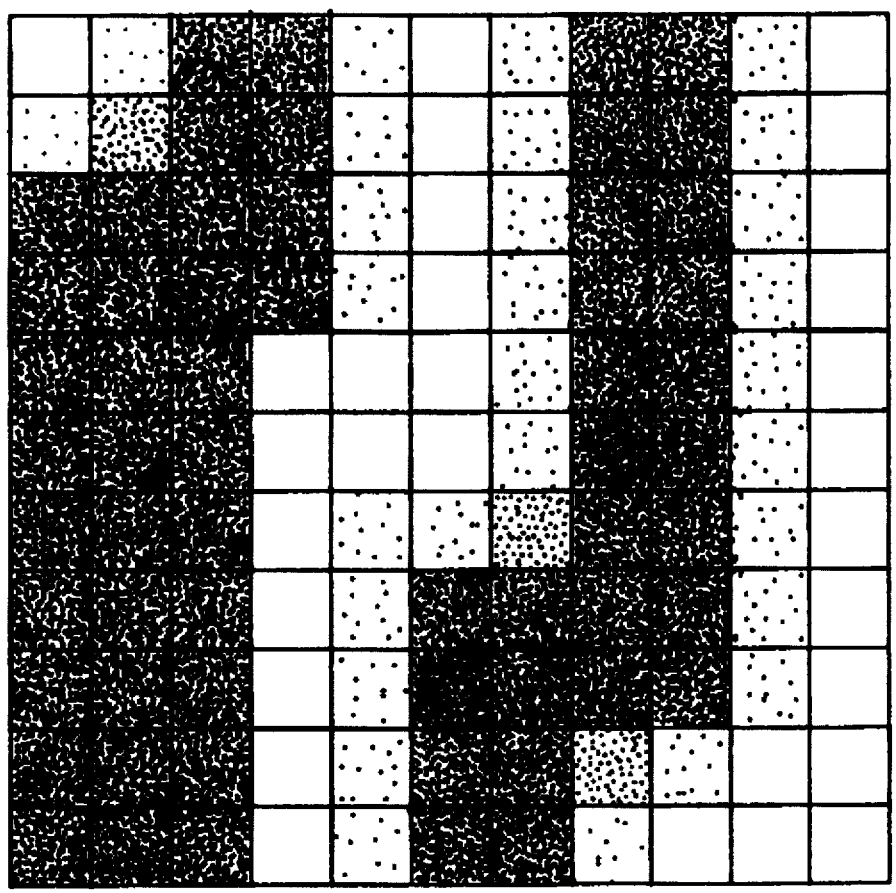
FIG. 3 shows an example of an output image enlarged without smoothing on a dither area and a line-gathered area.

However, in this construction, if the resolution of an output device is comparatively higher than that of the original image data, the resolution ratio becomes higher. In the output image, since line-gathered portions are enlarged, generation of black corruption portions is suppressed. However, jagged portions are conspicuous due to enlargement without smoothing on the dither/line-gathered areas. FIG. 3 shows an example of an image enlarged from the image in FIG. 1A. The image includes conspicuous jagged portions because the image has been enlarged without smoothing on the dither/line-gathered areas.

In consideration of the above problem, the following embodiments obtain an output image of excellent quality when a binary image is outputted by a digital copying machine.

First Embodiment

Figure 4:
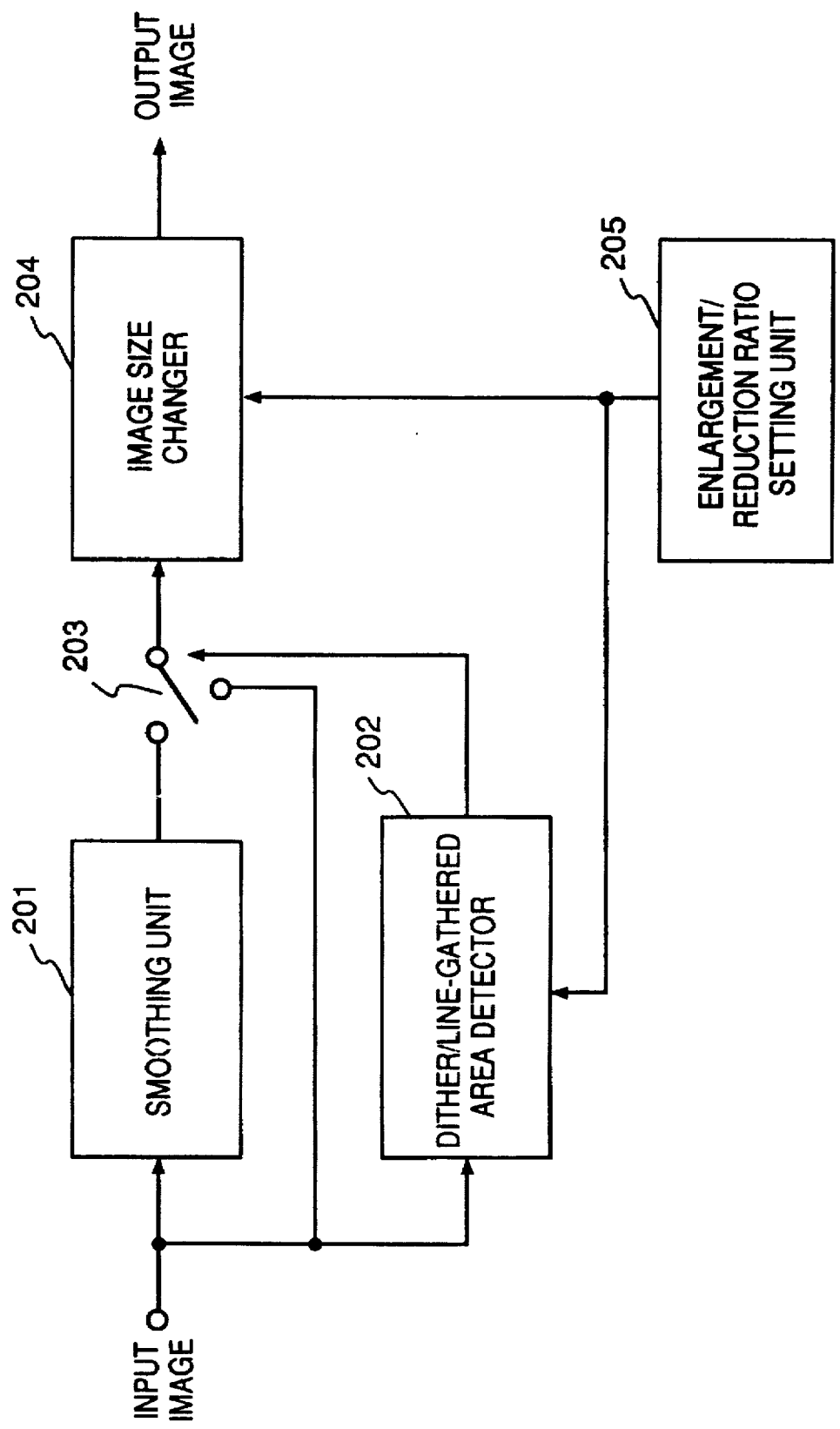
FIG. 4 is a block diagram showing the construction of an image processing apparatus according to a first embodiment of the present invention.

FIG. 4 is a block diagram showing the construction of an image processing apparatus according to a first embodiment of the present invention. Though the detailed description will be made later, when a binary image is outputted by a digital copying machine, the present embodiment obtains an output image of excellent quality by changing detection condition of the dither/line-gathered area detector 202 in accordance with the enlargement/reduction ratio set by the enlargement/reduction ratio setting unit 205.

Figure 5:
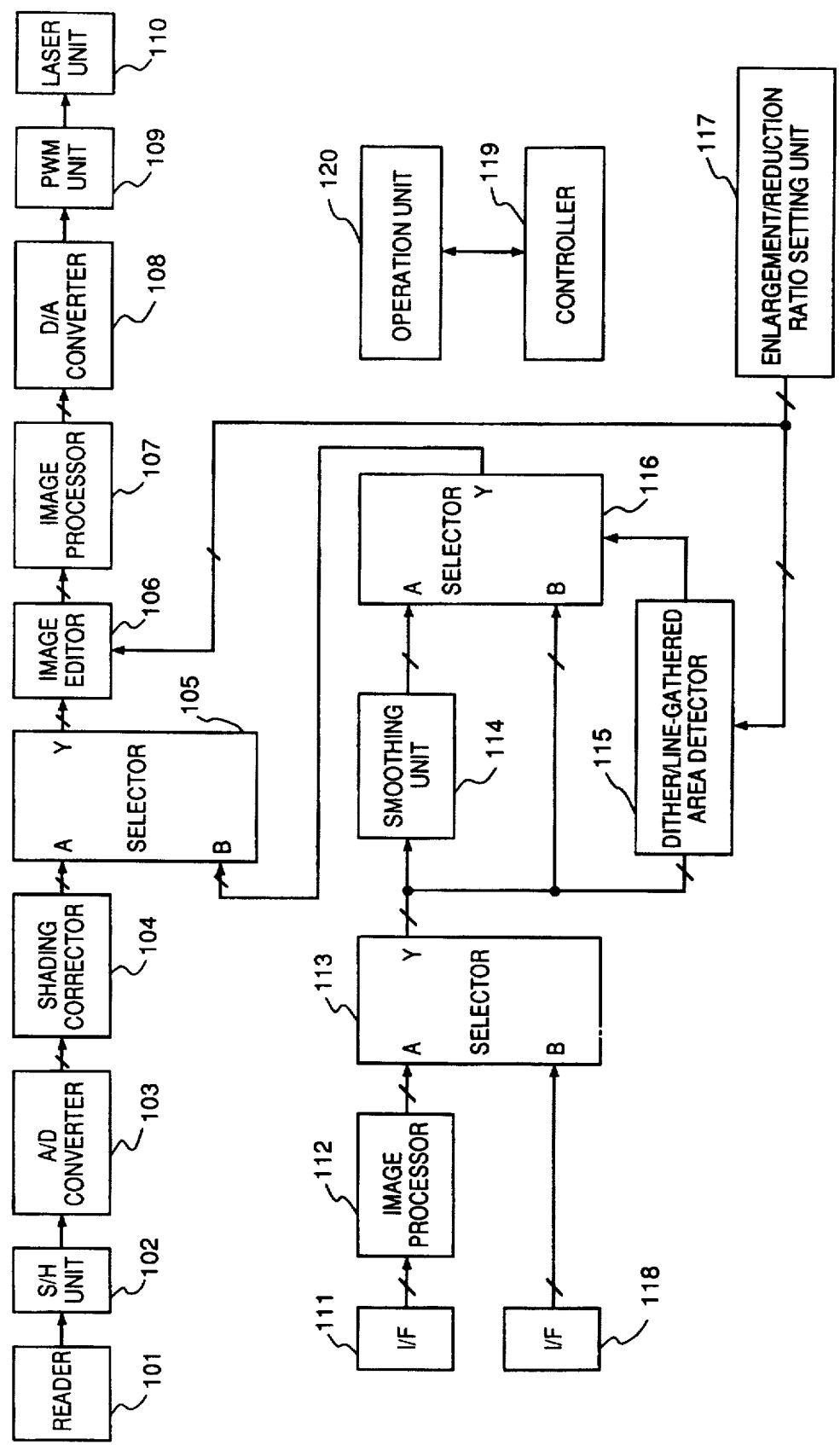
FIG. 5 is a block diagram showing the construction of a digital copying machine comprising the image processing apparatus of the embodiment.

FIG. 5 is a block diagram showing the construction of the digital copying machine comprising an image processing apparatus of the present embodiment.

In FIG. 5, numeral 119 denotes a controller comprising a CPU, a ROM, a RAM, an I/O unit and the like, for controlling the following components via buses (not shown) and signal lines (not shown), in accordance with programs stored in the ROM; 120, an operation unit comprising a keyboard for inputting instructions and the like and an LCD panel for displaying the operation status and operation condition of the apparatus, for inputting instructions from a user and transferring the input instructions to the controller 119 and displaying information from the controller 119.

Numeral 101 denotes a reader comprising a line-type CCD sensor, for receiving light reflected from an original via an optical system (not shown) and outputting image signal of the original image.

Numeral 102 denotes a sample and hold unit (S/H unit) for sampling and holding the image signal outputted from the reader 101; 103, an analog/digital converter (A/D converter) for converting the analog image signal held by the S/H unit 102 into an 8-bit digital image signal; 104, a shading corrector for performing shading correction on the image signal inputted from the A/D converter 103 to correct variations in the gain and the offset value at each pixel due to the unevenness of a light source and optical system (not shown) for image reading and the uneven sensitivity of the CCD sensor of the reader 101.

Numeral 105 denotes a selector for inputting the image signal outputted from the shading corrector 104 and an image signal outputted from a selector 116 to be described later, and outputting one of the signals under the control of the controller 119.

Numeral 106 denotes an image editor for performing image editing processing such as enlargement/reduction, negative/positive conversion and movement of an image of the image signal inputted from the selector 105. Note that the enlargement/reduction ratio is set by an enlargement/ reduction ratio setting unit 117. Numeral 107 denotes an image processor for performing non-linear image processing such as LOG conversion and γ correction on the image signal inputted from the image editor 106.

Numeral 108 denotes a digital/analog converter (D/A converter) for converting the digital image signal inputted from the image processor 107 into an analog image signal; 109, a pulse-width modulation unit (PWM unit) for outputting a signal of a pulse width corresponding to the analog image signal inputted from the D/A converter 108; and 110, a laser unit for outputting a laser light in accordance with the signal inputted from the PWM unit 109.

Though not shown, the laser light outputted from the laser unit 110 is applied to an electrostatic drum by an optical system, and forms a latent image on the electrostatic drum. The latent image is transferred onto a recording medium such as a recording sheet by an electrophotographic process.

Numeral 111 denotes an interface (I/F) for connecting the apparatus with, e.g., a personal computer. The interface 111 may be a general-purpose interface, e.g., an SCSI interface, an RS232C interface, an RS422 interface, a GPIB interface or a centronics interface. Note that the I/F 111 may be a network I/F for connecting the apparatus to, e.g., a LAN. Numeral 112 denotes an image processor for converting PLD (page description language) data inputted via the I/F 111 into image data, and if multi-level image data is inputted, binarizing the multi-level image data, then outputting a binarized image signal. The image processor 112 outputs a binarized image signal corresponding to the bit width of signals processed by the other components of the apparatus. For example, if the other components process an 8-bit width signal, the image processor 112 outputs a binarized image signal comprising "00h" and "FFh".

Numeral 118 denote an I/F for connecting the apparatus to, e.g., a facsimile apparatus, in which a binary image signal is inputted. Similar to the image processor 112, if the bit width of the input signal and the bit width of signals processed by the other components do not coincide, the I/F unit 118 outputs a binary image signal corresponding to the bit width of the signals processed by the other components.

Numeral 113 denotes a selector for inputting the image signal outputted by the image processor 112 and the image signal inputted via the I/F 118, and outputting one of the signals.

Numeral 114 denotes a smoothing unit for smoothing the binary image inputted from the selector 113; 115, a dither/ line-gathered area detector for detecting a dither area or a line-gathered area from the binary signal inputted from the selector 113 in accordance with the enlargement/reduction ratio set by the enlargement/reduction ratio setting unit 117, and controlling a selector 116.

The selector 116 inputs the smoothed image signal from the smoothing unit 114 and the image signal before smoothing, and outputs one of the signals under the control of the dither/line-gathered area detector 115. The image signal outputted from the selector 116 is inputted into the selector 105.

The controller 119 controls the selectors 105 and 113 in the respective modes. In a copying mode, the controller 119 causes the selector 105 to select the output from the shading corrector 104. In a printer mode, the controller 119 causes the selector 113 select the output from the image processor 112 and causes the selector 105 to select the output from the selector 116. In a facsimile mode, the controller 119 causes the selector 113 to select the output from the I/F 118 and causes the selector 105 to select the output from the selector 116.

If the copying mode is set by the controller 119, the enlargement/reduction ratio setting unit 117 outputs an enlargement/reduction ratio set in accordance with an instruction from the operation unit 120 as 8-bit information. In case of the printer mode or the facsimile mode, the enlargement/reduction ratio setting unit 117 outputs the enlargement/reduction ratio set by the controller 119 as 8-bit information in accordance with the resolution of the image signal inputted from the I/F 111 or I/F 118. The controller 119 sets the enlargement/reduction ratio to, 400/240=5/3, if the output resolution is 400 dpi and the resolution of the image data is 240 dpi.

The controller 119 controls the flow of image signals so that operations such as copying a read original image, printing the image inputted via the I/F 111, and printing the facsimile image inputted via, e.g., the I/F 118 can be smoothly performed, thus the user in the present embodiment does not need monitor the statuses of these operations.

Next, the operation of the smoothing unit 114 will be described below.

The smoothing unit 114 outputs data of "FFh" and "00h" with respect to white and black colors. Also, the smoothing unit 114 changes the level of a pixel adjacent to the boundary between black and white pixels into "FFh", "00h" or an appropriate halftone level.

Figure 6A:
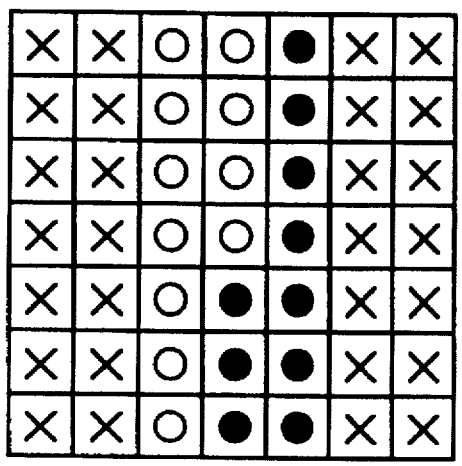
FIGS. 6A and 6B show examples of pixel patterns to be converted to halftone level patterns.
Figure 6B:
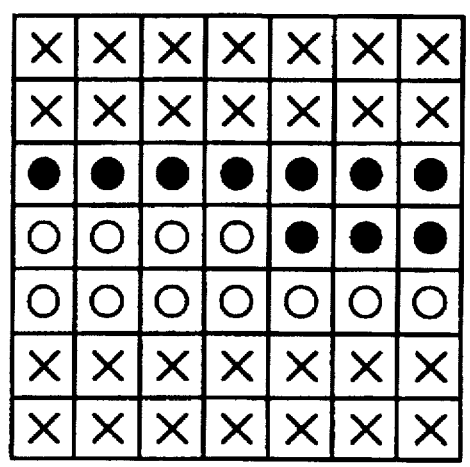
Figure 7A:
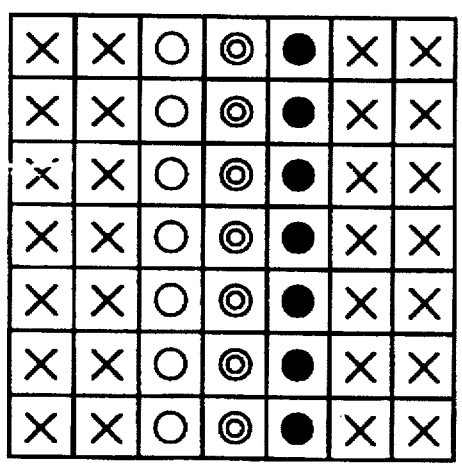
FIGS. 7A and 7B show examples of pixel patterns of halftone level from the pixel patterns in FIGS. 6A and 6B.
Figure 7B:
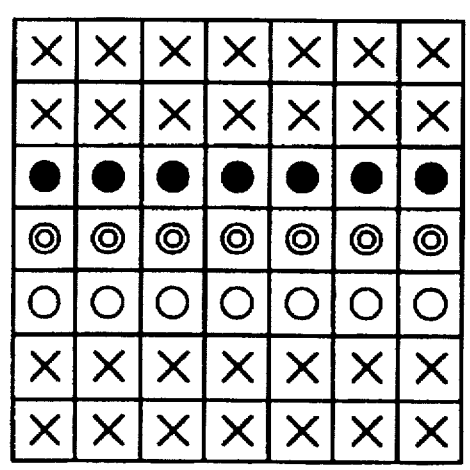

FIGS. 6A and 6B show two pixel pattern examples to be subjected to level conversion where the pixels adjacent to the boundary are converted into pixels of halftone levels. In FIGS. 6A and 6B, each cell corresponds to a pixel. Symbol "x" means "do not care"; symbol "○" represents a white pixel; and symbol "●", black pixel. When the pattern of input image data coincides with a predetermined pixel pattern as shown in FIGS. 6A and 6B, the smoothing unit 114 changes the level of the central pixel of the input image into an appropriate halftone level. FIG. 7A shows a pixel pattern converted from the pixel pattern in FIG. 6A; FIG. 7B, a pixel pattern converted from the pixel pattern in FIG. 6B. In FIGS. 7A and 7B, a symbol "" represents a pixel of a halftone level.

Next, the operation of the dither/line-gathered area detector 115 will be described below.

FIGS. 8A and 8B show dither/line-gathered area detecting methods. The present embodiment detects a dither area or a line-gathered area using, e.g., 7×7 pixels with the central pixel as a pixel of interest.

FIG. 8A shows a dither area detecting method. That is, it is assumed that if the values of nine pixels within one solid line frame are equal, the logic value within the solid line frame is "true", while if the values are not equal, the logic value is "false". If the logic values of the four solid line frames are all "false", it is determined that the central pixel (pixel of interest) is included in a dither area.

FIG. 8B shows a line-gathered area detecting method. That is, it is assumed that if the values of nine pixels within one solid line frame are all indicative of "white", the logic value within the solid line frame is "true", otherwise, the logic value is "false". If one of the logic values of the four solid line frames is "false", it is determined that the central pixel (pixel of interest) of the 7×7 pixels is included in a line-gathered area.

More specifically, the dither/line-gathered area detector 115 performs detection of a pixel included in a dither/line-gathered area using the above methods. If the dither/line-gathered area detector 115 detects such pixel, the selector 116 selects the output from the selector 113, i.e., the image data which has not been smoothed. However, if the enlargement/reduction ratio outputted from the enlargement/reduction ratio setting unit 117 is a predetermined value or greater, the dither/line-gathered area detector 115 detects only a dither area but does not detect a line-gathered area. In this case, smoothing on line-gathered areas can be inhibited in accordance with the set enlargement/reduction ratio. Note that the predetermined enlargement/reduction ratio is, e.g., 120% or 170% or greater, however, the value can be set in accordance with the feature of an output system such as electrophotographic process, otherwise, the user may set the value at the operation unit 120.

FIG. 9 shows an image example enlarged from the image in FIG. 1A. In this example, the magnification ratio is the predetermined value or, greater, line-gathered area detection has not been performed and the image area has been smoothed. Compared with the output example in FIG. 3, the obtained image in FIG. 9 has better image quality.

It should be noted that in the present embodiment, the detection of dither/line-gathered area is controlled, however, the standards for a printer to perform printing based on the image data inputted via the I/F 111 or the standards for a facsimile may be discriminated by the controller 119, and the dither/line-gathered area detection may be controlled based on the discrimination result.

Further, in the present embodiment, the dither/line-gathered area detector 115 uses a predetermined pixel pattern for detection, however, a detection pattern may be set based on information on pattern matching executed by the smoothing unit 114.

In this manner, as dither/line-gathered areas are not smoothed, generation of unnecessary level change or black corruption can be prevented. Further, if the set enlargement/reduction ratio is a predetermined value or greater, only smoothing of a dither area is inhibited. Thus, in an output image, jagged portions are rendered inconspicuous, and excellent image quality can be obtained.

Second Embodiment

Next, an image processing apparatus according to a second embodiment of the present invention will be described below. Note that in the second embodiment, elements corresponding to those in the first embodiment have the same reference numerals, and the explanations of these elements will be omitted.

The second embodiment employs a smoothing method and a dither/line-gathered area detecting method different from those in the first embodiment.

Figure 10A:
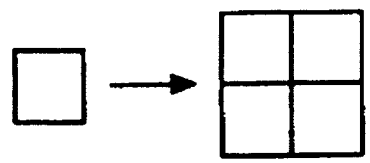
FIGS. 10A to 10C show examples of smoothing according to a second embodiment of the present invention.
Figure 10B:
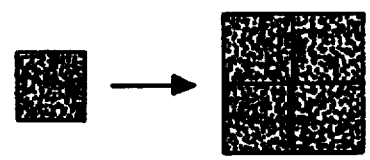
Figure 10C:
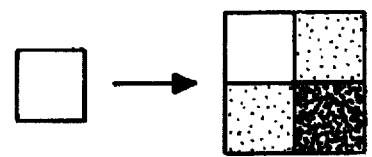

FIGS. 10A to 10C show the smoothing method according to the second embodiment, where four white pixels "FFh" (FIG. 10A) and four black pixels "00h" (FIG. 10B) are outputted with respect to an input white pixel and an input black pixel. Further, in this method, to smooth the image outline, a pixel adjacent to the boundary between black and white pixels is changed into four white pixels, four black pixels, or four pixels including pixel(s) of an appropriate halftone level, as shown in FIG. 10C. Note that the present embodiment employs the pattern matching method of the first embodiment.

In the present embodiment, as the resolution is doubled by smoothing, in a case where the output resolution is 400 dpi and the resolution of the input image data is 240 dpi, the controller 119 sets the enlargement/reduction ratio to (400/240)/2=5/6. For a similar reason, the dither/line-gathered area detector 115 sets the enlargement/reduction ratio for inhibiting line-gathered area detection to, e.g., 60% or 85% (½ of that of the first embodiment).

In this manner, the present embodiment can obtain the same effect as that of the first embodiment, further, can obtain an output image of better image quality.

Third Embodiment

Next, an image processing apparatus according to a third embodiment of the present invention will be described below. In the third embodiment, elements corresponding to those in the first embodiment have the same reference numerals, and the explanations of these elements will be omitted.

The third embodiment employs a dither/line-gathered area detecting method different from that of the first embodiment.

Figure 11A:
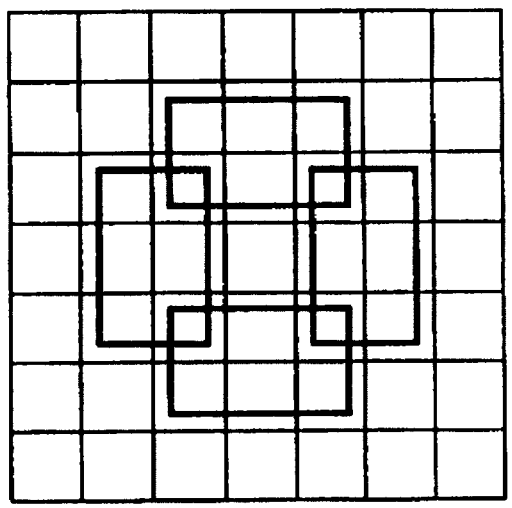
FIGS. 11A and 11B are explanatory views of a dither/line-gathered area detecting method according to a third embodiment of the present invention.
Figure 11B:
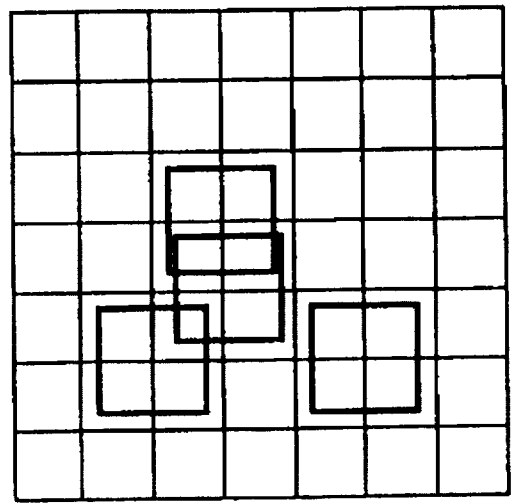

FIGS. 11A and 11B show dither/line-gathered area detecting methods of the present embodiment.

FIG. 11A shows a dither area detecting method. That is, it is assumed that if the values of six pixels within one solid line frame are equal, the logic value within the solid line frame is "true", while if the values are not equal, the logic value is "false". If the logic values of the four solid line frames are all "false", it is determined that the central pixel (pixel of interest) is included in a dither area.

FIG. 11B shows a line-gathered area detecting method. That is, it is assumed that if the values of four pixels within one solid line frame are all indicative of "white", the logic value within the solid line frame is "true", otherwise, the logic value is "false". If one of the logic values of the four solid line frames is "false", it is determined that the central pixel (pixel of interest) of the 5×5 pixels is included in a line-gathered area.

More specifically, FIGS. 11A and 11B show 7×7 pixel matrices to clarify the difference from the methods shown in FIGS. 8A and 8B. The methods in FIGS. 11A and 11B is for detecting dither/line-gathered areas using 5×5 pixels with the central pixel as a pixel of interest. In comparison with the methods in FIGS. 8A and 8B, the number of pixels in the present methods is reduced. This increases the possibility of logic value "true" at each respective solid line frame, accordingly, lowers the probability of determination that a pixel of interest is included in a dither/line-gathered area.

If the enlargement/reduction ratio outputted from the enlargement/reduction ratio setting unit 117 is less than a predetermined value, the dither/line-gathered area detector 115 of the present embodiment detects a dither/line-gathered area using the methods shown in FIGS. 11A and 11B.

In this manner, the present embodiment can obtain the same effect as that of the first embodiment. Further, in the present embodiment, if the enlargement/reduction ratio is a predetermined value or greater, the detection rate is lowered so as to reduce smoothing inhibiting rate, thus, smoothing is performed in some of the dither/line-gathered areas. This obtains an output image of further excellent image quality.

Modification to Embodiments

The smoothing methods and the dither/line-gathered area detecting methods in the above-described embodiments can be arbitrarily combined. For example, the methods in FIGS. 8A and 8B are used with respect to a case where the enlargement/reduction ratio is less than a first predetermined value; the methods in FIGS. 11A and 11B are used as the second method with respect to a case where the enlargement/reduction ratio is greater than the first predetermined ratio and less than a second predetermined value; and line-gathered area detection is not performed with respect to a case where the enlargement/reduction ratio is greater than the second predetermined value.

Further, in the above embodiments, the present invention is applied to a digital copying machine, however, the present invention is not limited to this application. For example, the present invention can be applied to any output device such as a display so far as it represents pixels of multi-levels. Further, the image input device may be, e.g., an electronic file.

The present invention can be applied to a System constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   smoothing means for smoothing input image data;
   judgment means for judging whether or not smoothing is to be performed on each pixel of the image data, in accordance with a pattern of a predetermined area of the image data and an image enlargement/reduction ratio; and
   output means for selecting a pixel smoothed by said smoothing means or a pixel not smoothed, in accordance with the result from judgment by said judgment means, and outputting the selected image data.

2. An image processing apparatus comprising:
   smoothing means for smoothing input image data;
   judgment means for judging whether or not smoothing is to be performed on each pixel of the image data, in accordance with a feature of an area of the image data, including the pixel of interest, and an image enlargement/reduction ratio; and
   output means for selecting a pixel smoothed by said smoothing means or a pixel not smoothed, in accordance with the result from judgment by said judgment means, and outputting the selected image data.

3. An image processing apparatus comprising:
   setting means for setting an enlargement/reduction ratio for enlarging/reducing an image;
   smoothing means for smoothing input image data;
   judgment means for judging whether or not smoothing is to be performed on each pixel of the image data, in accordance with a feature of an area of the image data, including a pixel of interest, and the enlargement/reduction ratio set by said setting means; and
   output means for selecting a pixel smoothed by said smoothing means or a pixel not smoothed, in accordance with the result from judgment by said judgment means, and outputting the selected image data.

4. The apparatus according to claim 3, further comprising enlargement/reduction means for enlarging/reducing the image data outputted by said output means, based on the enlargement/reduction ratio set by said setting means.

5. The apparatus according to claim 3, wherein said setting means sets the enlargement/reduction ratio in accordance with a resolution of the input image data and a resolution upon outputting an image based on the image data.

6. The apparatus according to claim 3, wherein said smoothing means outputs image data smoothed and at the same time enlarged/reduced at a predetermined enlargement/reduction ratio.

7. The apparatus according to claim 3, wherein said judgment means judges the feature of the area including the pixel of interest by comparing a pattern of a predetermined area including the pixel of interest and a predetermined pattern.

8. The apparatus according to claim 7, wherein if the area including the pixel of interest is a dither area to be processed by a dither method or a line-gathered area, said judgment means judges that the pixel of interest is not to be smoothed.

9. The apparatus according to claim 7, wherein said judgment means changes the predetermined pattern in accordance with the enlargement/reduction ratio.

10. The apparatus according to claim 9, wherein if the enlargement/reduction ratio is a predetermined value or greater, said judgment means does not detect the dither area or line-gathered area.

11. The apparatus according to claim 8, wherein said judgment means sets a plurality of pixel groups, each comprising a plurality of pixels adjacent to each other, around the pixel of interest, and if the pixels have values different from each other in each pixel group, said judgment means judges that the pixel of interest is included in the dither area.

12. The apparatus according to claim 11, wherein said judgment means judges whether or not the area including the pixel of interest is a dither area, within an area around the pixel of interest and having a size corresponding to the enlargement/reduction ratio.

13. The apparatus according to claim 12, wherein if said setting means sets an enlargement/reduction ratio more than the predetermined value, said judgment means reduces the size of the area.

14. The apparatus according to claim 8, wherein said judgment means sets a plurality of pixel groups, each comprising a plurality of pixels adjacent to each other, around the pixel of interest, and if at least one pixel group includes a black pixel, said judgment means judges that the pixel of interest is included in the line-gathered area.

15. The apparatus according to claim 14, wherein said judgment means judges whether or not the area including the pixel of interest is the line-gathered area, within an area around the pixel of interest and having a size corresponding to the enlargement/reduction ratio.

16. The apparatus according to claim 15, wherein if said setting means sets an enlargement/reduction ratio of the predetermined value or greater, said judgment means reduces the size of the area.

17. An image processing method comprising:

a smoothing step of smoothing input image data;

a judgment step of judging whether or not smoothing is to be performed on each pixel of the image data, in accordance with a pattern of a predetermined area of the image data and an image enlargement/reduction ratio; and an output step of selecting a pixel smoothed in said smoothing step or a pixel not smoothed, in accordance with the result from judgment in said judgment step, and outputting the selected image data.

18. An image processing method comprising:

a smoothing step of smoothing input image data;

a judgment step of judging whether or not smoothing is to be performed on each pixel of the image data, in accordance with a feature of an area of the image data, including a pixel of interest, and an image enlargement/reduction ratio; and an output step of selecting a pixel smoothed in said smoothing step or a pixel not smoothed, in accordance with the result from judgment in said judgment step, and outputting the selected image data.

19. An image processing method comprising:

a setting step of setting an enlargement/reduction ratio for enlarging/reducing an image;

a smoothing step of smoothing input image data;

a judgment step of judging whether or not smoothing is to be performed on each pixel of the image data, in accordance with a feature of an area of the image data, including a pixel of interest, and the enlargement/reduction ratio set in said setting step; and an output step of selecting a pixel smoothed in said smoothing step or a pixel not smoothed, in accordance with the result from judgment in said judgment step, and outputting the selected image data.

* * * * *

UNITED STATES PATENT AND TRADEMARK OFFICE
CERTIFICATE OF CORRECTION

PATENT NO. : 5,646,741

DATED : July 8, 1997

INVENTOR(S) : IZURU HORIUCHI ET AL.

It is certified that error appears in the above-identified patent and that said Letters Patent is hereby corrected as shown below:

COLUMN 1

Line 12, "file" should read --file,--.
    Line 57, "a" should read --an--.

COLUMN 3

Line 56, "image" should read --an image--.

COLUMN 4

Line 46, "denote" should read --denotes--.

COLUMN 5

Line 7, "select" should read --to select--.
    Line 30, "monitor" should read --to monitor--.
    Line 50, """" should read --" © "--.

COLUMN 6

Line 26, "or," should read --or--.

COLUMN 7

Line 47, "is" should read --are--.
    Line 53, "accordingly," should read --and accordingly--.
    Line 65, "rate" should be deleted.

UNITED STATES PATENT AND TRADEMARK OFFICE
CERTIFICATE OF CORRECTION

PATENT NO. : 5,646,741

DATED : July 8, 1997

INVENTOR(S) : IZURU HORIUCHI ET AL.

It is certified that error appears in the above-identified patent and that said Letters Patent is hereby corrected as shown below:

<u>COLUMN 8</u>

Line 21, "System" should read --system--.

Signed and Sealed this

Seventeenth Day of February, 1998

Attest:

BRUCE LEHMAN

*Attesting Officer*   *Commissioner of Patents and Trademarks*